US006160337A

United States Patent [19]

Warner

[11] Patent Number: 6,160,337

[45] Date of Patent: Dec. 12, 2000

[54] ELECTRIC MOTOR WITH CARBON TRACK COMMUTATOR

[75] Inventor: Allan S. Warner, Clark, N.J.

[73] Assignee: Joyal Products, Inc.

[21] Appl. No.: 09/397,687

[22] Filed: Sep. 16, 1999

Related U.S. Application Data

[62] Division of application No. 08/871,047, Jun. 9, 1997, Pat. No. 5,955,812.

[51] Int. Cl.[7] .......... H02K 13/04; H01R 39/06

[52] U.S. Cl. .......... 310/233; 310/235; 310/236; 310/237; 310/43; 310/8; 29/597

[58] Field of Search .......... 310/233, 234, 310/235, 236, 237

[56] References Cited

U.S. PATENT DOCUMENTS

| | | | |
|---|---|---|---|
| 4,399,383 | 8/1983 | Kamiyama | 310/233 |
| 4,559,464 | 12/1985 | Stokes | 310/233 |
| 5,128,578 | 7/1992 | Strobl | 310/234 |
| 5,157,299 | 10/1992 | Gerlach | 310/237 |
| 5,175,463 | 12/1992 | Farago et al. | 310/237 |
| 5,245,240 | 9/1993 | Takasaki | 310/237 |
| 5,255,426 | 10/1993 | Farago et al. | 29/597 |
| 5,369,326 | 11/1994 | Strobl | 310/235 |
| 5,386,167 | 1/1995 | Strobl | 310/237 |
| 5,400,495 | 3/1995 | Murai | 29/597 |
| 5,422,528 | 6/1995 | Prahl | 310/235 |
| 5,432,993 | 7/1995 | Strobl | 29/597 |
| 5,530,311 | 6/1996 | Ziegler | 310/237 |
| 5,552,652 | 9/1996 | Shimoyama et al. | 310/237 |
| 5,604,391 | 2/1997 | Edgerton | 310/234 |
| 5,607,293 | 3/1997 | Luedtke | 417/423.7 |
| 5,629,576 | 5/1997 | Shimoyama | 310/237 |
| 5,677,588 | 10/1997 | Strobl | 310/237 |

*Primary Examiner*—Elvin Enad
*Attorney, Agent, or Firm*—Edward Dreyfus

[57] ABSTRACT

An electric motor according to the principles of the present invention includes a stator or stationary part of the motor and an armature. The armature includes a shaft having a rotation axis and a commutator subassembly fixed symmetrically to the shaft that includes an insulating body surrounding the shaft and a plurality of circumferentially spaced, carbon-based material segments surrounding the shaft. The carbon segments are held to the body and each segment has a brush contacting surface. An equal plurality of metallic commutator members have at least a part located and molded within the corresponding carbon segment for providing good mechanical and electrical connection between the carbon segment and metallic commutator member and to isolate the metallic part within the carbon segment from harmful external environments such as described above. According to other aspects of the present invention, a second part of each metallic commutator segment extends from the carbon segment into and is molded within the insulating body. This design increases the mechanical connection between the corresponding segment and the body while achieving the isolation and electrical contact described above. A third part of the metallic commutator forms a U-shaped tang.

5 Claims, 12 Drawing Sheets

ELECTRIC MOTOR WITH CARBON TRACK COMMUTATOR

RELATED APPLICATION

This is a divisional application of application Ser. No. 08/871,047, filed Jun. 9, 1997, now U.S. Pat. No. 5,955,812 issued Sep. 21, 1999.

FIELD OF INVENTION

The present invention relates to electric motors and more specifically to motors having carbon based commutator subassemblies and the method of making the same.

BACKGROUND

Electric motors having face type carbon commutators have become popular for use in fuel pump assemblies for organic fuels, such as methanol, propane and the like, and for hydrocarbon mixtures including organic fuels, the mixture commonly known as gasohol. The typical motor of the flat disk type includes an armature with a plurality of electrically conductive base metals electrically insulated from each other but solidly secured in a body portion formed of insulating material. Carbon based protective members are soldered to the base metal members after the base metal surface is passified with a layer of another metal to assure a good bond between the solder, carbon and other metal layer. See for example, U.S. Pat. Nos. 5,245,240; 5,255,426; 5,175,463; and 5,157,299.

Conventional motors fitted with disk or face type carbon based commutators are known to experience various technical problems and expensive processing due to their design, costly materials, and excessive manufacturing difficulties and steps. For example, since the alcohol or other oxygenated constituent corrodes copper, the copper seat or base must be completely encapsulated in non-corrosive materials. Some conventional commutators include the carbon elements soldered directly to copper, nickel or other metal or alloy commutators. Alternatively, in order to assure good electrical and mechanical contact between these parts, a silver layer based metal layer is first coated on the copper based metal facing the carbon layer in order to avoid the need to passify the carbon before soldering. In either case, the silver layer or the passification of carbon adds to the cost of manufacturing and the cost of parts.

During subsequent steps of motor manufacturing, the motor winding wire is placed within the tang profile during the assembly of the conventional armature. The work then moves to a fusing station where a fusing machine applies heat, current and pressure to the tang, burns off or vaporizes the wire insulation beneath the tang, and creates a fixed fusion joint between the deformed tang and wire combination. Because of the low melting point of the solder layer in the vicinity of the tang, it is known that the solder will often run or liquify in response to the highly heated tang and metallic commutator zones. Attempts to localize this heat solely to the tang material external of the carbon profile have only been partially satisfactory making manufacturing quality control difficult and/or expensive.

Although the carbon protective commutator has great application in gasohol fuel pumps and the like, it is known that motor maintenance requirements are greatly reduced with these carbon based commutator brush contacts. Accordingly, there is a need to apply the carbon based brush contact to other motor applications and designs such as a barrel type motor for various other applications.

As can be seen from the following summary and detailed description, the present invention solves the forgoing technical and manufacturing problems, avoids the use or need for soldering altogether, and provides other benefits and advantages in the design, operation, and manufacturing of motors of these types.

SUMMARY OF INVENTION

An electric motor according to the principles of the present invention includes a stator or stationary part of the motor and an armature. The armature includes a shaft having a rotation axis and a commutator subassembly fixed symmetrically to the shaft that includes an insulating body surrounding the shaft and a plurality of circumferentially spaced, carbon-based material segments surrounding the shaft. The carbon segments are held to the body and each segment has a brush contacting surface. An equal plurality of metallic commutator members have at least a part located and molded within the corresponding carbon segment for providing good mechanical and electrical connection between the carbon segment and metallic commutator member and to isolate the metallic part within the carbon segment from harmful external environments such as described above.

According to other aspects of the present invention, a second part of each metallic commutator segment extends from the carbon segment into and is molded within the insulating body. This design increases the mechanical connection between the corresponding segment and the body while achieving the isolation and electrical contact described above. A third part of the metallic commutator forms a U-shaped tang.

It is an object of the present invention to provide a new and improved motor having a carbon covered commutator subassembly mechanically and electrically bonded to the metallic commutator segments without the need for soldering or other passivation techniques.

It is a further object of the present invention to provide a new and improved motor having a carbon based material serving to protect the metal commutator segments and secure thereto carbon based brush contacts without the need to passify or solder the parts together.

Another object is to provide a method of making the above mentioned commutator subassembly.

In one exemplary embodiment incorporating the principles of the present invention, a motor having a stator and armature includes a thin face or disk commutator subassembly provided with an insulating body and each metallic commutator secured within the body or alternatively within the carbon material layer. One or more metallic commutator parts is molded within the body or carbon layer to aid in the mechanical and electrical connection between the carbon layer and the body. The metallic commutator includes a tang-like member extending outside the walls of the embedding material or layers, which tang is shaped to receive the motor winding wire for fusing or welding thereto.

In still another exemplary embodiment, each metallic commutator is located wholly within the respective carbon segment except for the external tang. No part of the metallic commutator, in this embodiment, extends into the insulating body.

In yet another exemplary embodiment according to the principles of the present invention, the metallic commutator is located generally at the boundary between the insulating substrate and the carbon layer. Pawls or other parts of the commutator extend into and are molded within the carbon layer to enhance the mechanical bond and electrical connection therewith so that soldering is unnecessary.

Another exemplary embodiment according to the principles of the present invention comprises a barrel type commutator subassembly in which the carbon layer is formed to encapsulate the metallic commutators, the latter of which also include parts that extend into and are molded within an insulating substrate layer or through an insulating substrate layer for mechanical and electrical connection thereto so as to join the carbon layer to the insulating substrate. The side surface of the carbon layer forms a slotted cylinder structure and serves as the brush track for the motor stator brushes.

It will be understood that, if the motor application requires for any of the above embodiments, insulating plastic or other suitable material can be molded over the external tang portions of the commutators, after fusing the tangs and wires together, in order to isolate the metallic tangs from any harmful environments to be encountered during motor operation.

According to other aspects of the present invention, methods are provided for making the subassemblies described above and a variety of commutator tang, insulating substrate, and carbon layer designs and shapes can be provided for various benefits and advantages in manufacturing and application. Other and further benefits and advantages will be understood from the following detailed description taken in view of the appended drawings, in which:

It will be understood that the drawings are not drawn to scale but instead are drawn to illustrate the technical design concepts hereof.

DETAILED DESCRIPTION

With reference to FIGS. 1–6, there is shown the principal steps of an exemplary method for making a face or disk type commutator subassembly with application, for example, as a gasohol fuel pump motor.

Figure 1:
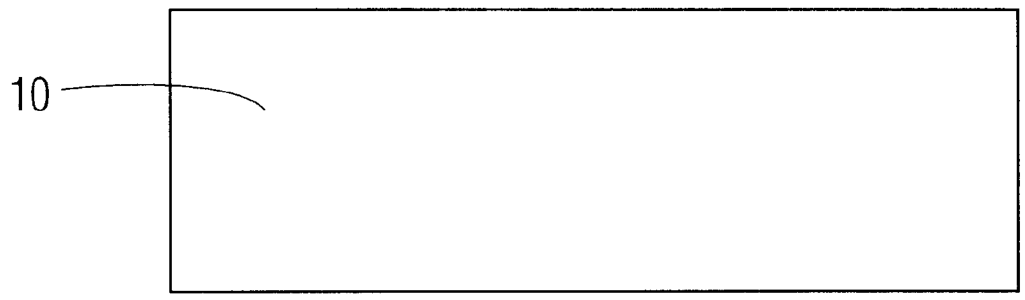
FIG. 1 shows a plan view of an exemplary metallic starter sheet for use in forming a face type metallic blank for use in making one example of a commutator according to the principles of the present invention.
Figure 2:
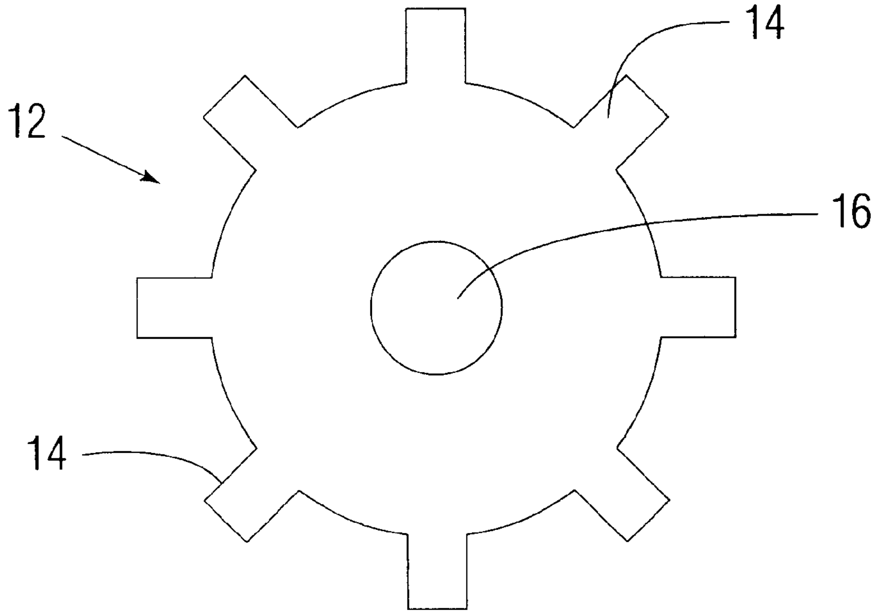
FIG. 2 is a plan view of an exemplary commutator blank stamped or formed from the starter sheet of FIG. 1.
Figure 3:
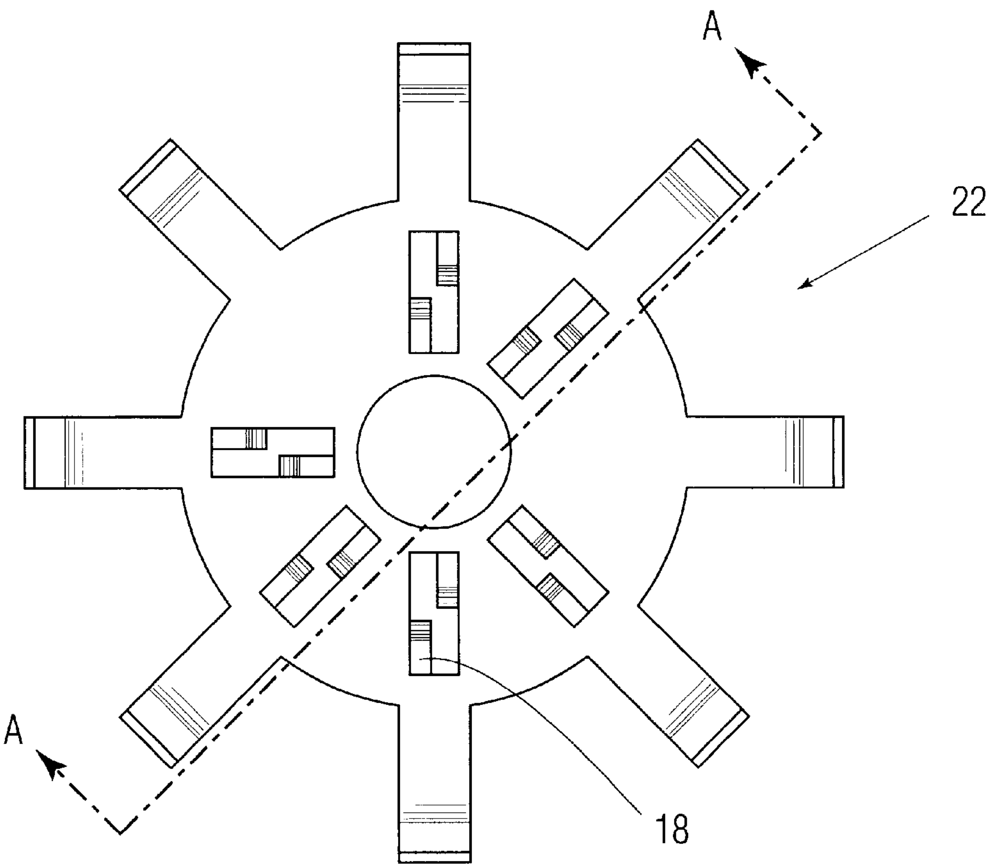
FIG. 3 is a plan view of FIG. 2 after the pawls are stamped or punched in the mid-portion of the blank and the distal ends of the tang extension are bent into tang shapes.
Figure 3A:
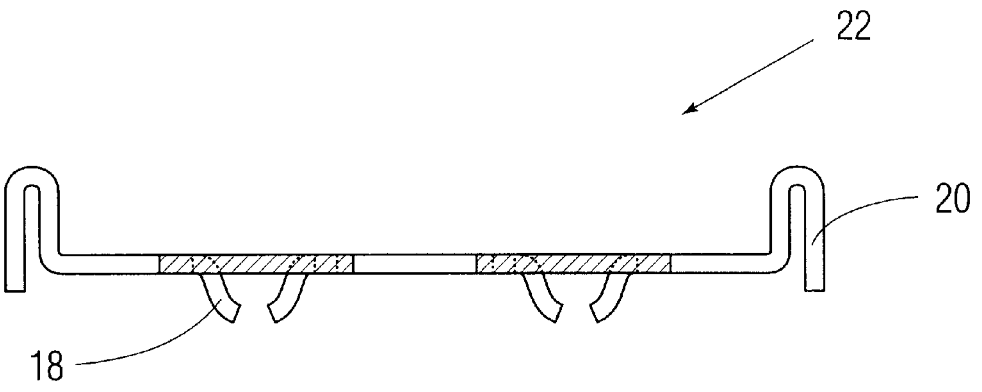
FIG. 3A is a side section taken along line 3A—3A of FIG. 3.

The metallic commutator segments can begin formation from a copper or copper alloy sheet 10, FIG. 1. A disk type commutator blank 12 with tang extension 14 and armature shaft opening 16 can be stamped, laser cut or otherwise formed from sheet 10.

Depending pawls 18 are stamped or punched in the body portion of blank 12. Preferably a pair of pawls is stamped for each segment although one pawl or three pawls can be formed, alternatively, depending on the final shape of the metallic segment described below. Also, in this embodiment, it is preferred to align the pawl cut generally radially with the tang extension because, as described below, the body of blank 12 will be cut radially intermediately of the tang or pawl locations.

In one exemplary method, tang extensions 14 are bent into tangs 20 at the same time or after pawls 18 are formed. Also if desired, pawls 18 can be formed when blank 12 is formed.

Figure 4:
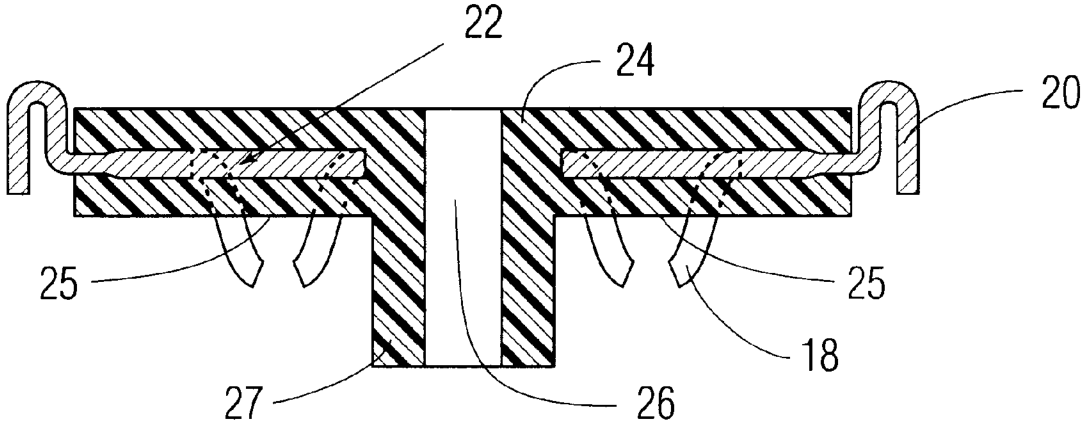
FIG. 4 is the same view as FIG. 3A after an insulating body is molded about the commutator blank.
Figure 5:
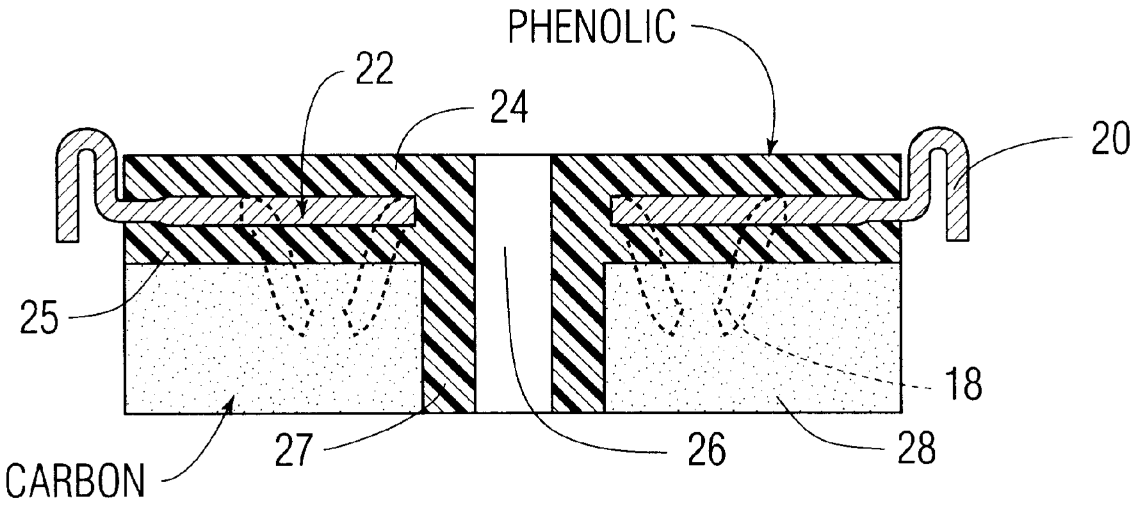
FIG. 5 is the same view as FIG. 4 after a carbon based layer has been pressure molded to the insulating body.
Figure 6:
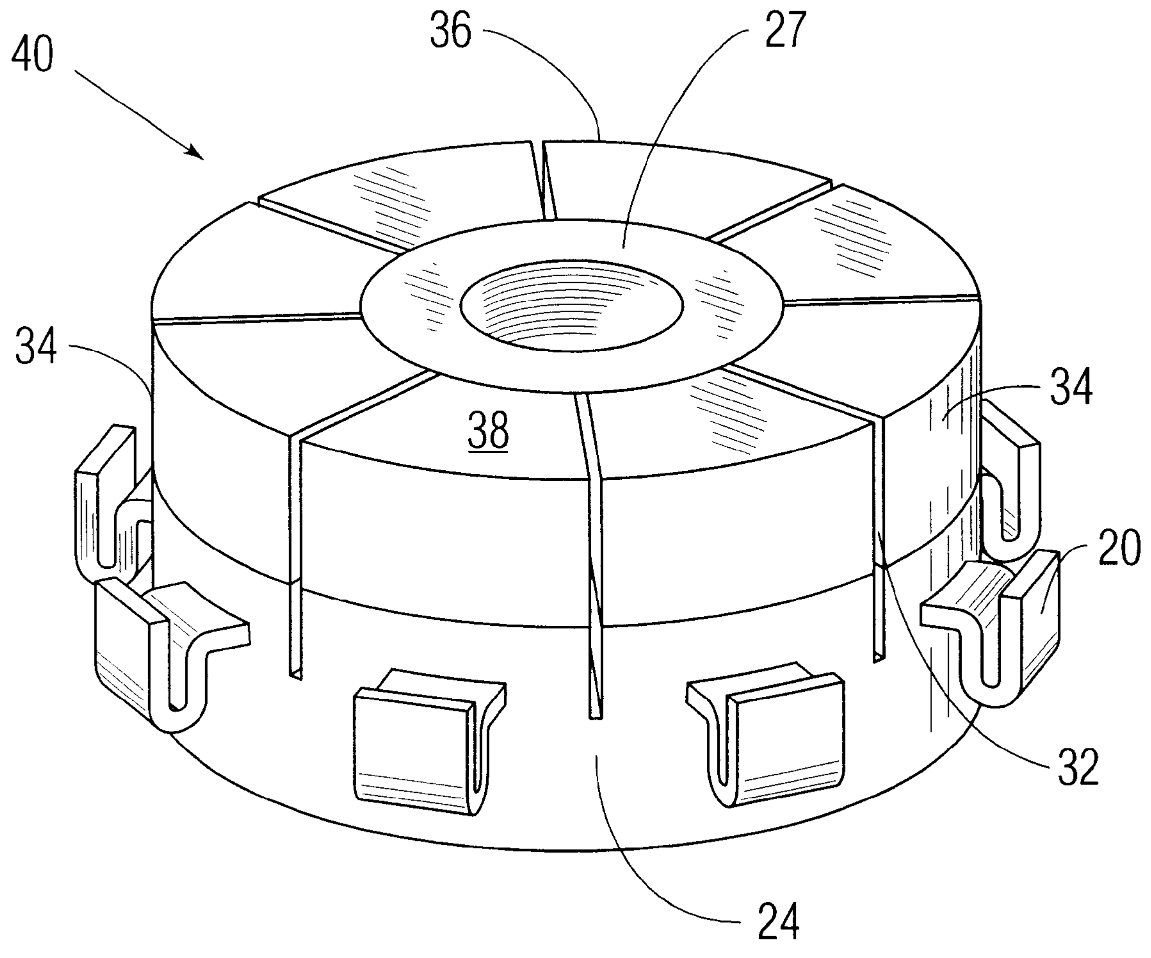
FIG. 6 is a perspective pictorial representation of the unit of FIG. 5 after the carbon layer, commutator blank and parts of the insulating body have been cut into segments.

With reference to FIG. 4, metallic commutator 22 is next completely embedded into an insulating body 24 except for tangs 20 that exit the side walls of body 24 and pawls 18 that extend through the insulating body face. Body 24 can be formed of any suitable standard moldable, insulating material such as phenolic, synthetic resin, hard plastic, or other suitable materials. Body 24 is molded about commutator 22 and includes a central shaft opening 26.

Thereafter, a disk or layer of carbon based material 28 first in powder form is pressed in disk form about depending pawls 18 and in contact with the facing surface 25 of body 24. See FIG. 5. Heat and pressure are applied to body 24 and carbon layer 28 to solidify the carbon based particles into a solid mass in contact with the body 24 facing surface 25 and mechanically and electrically molded completely about and secured to pawls 18. This heating and pressing step can be undertaken in a standard transfer molding system or other suitable system. At the same time, the molded carbon layer is pressed firmly against and molded to the facing side 25 and the recess forming shaft or mounting member 27 of the phenolic commutator body portion 24. A good electrical contact path and mechanical bond is formed by the embedded pawls 18 and molded carbon layer.

Thereafter, (FIG. 6) diamond saws or lasers can be used to cut narrow grooves 32 axially through the carbon layer 28 and partially through body 24 but sufficiently to cut through metal blank 22. These grooves or cuts 32 isolate the carbon layer into carbon segments 34 and electrically isolate metallic commutator segments 36. Note in FIG. 6, however, the lower part of body 24 is not segmented and serves to provide sufficient strength to hold the subassembly together during manufacture and operation of the completed motor. It will be understood that the outer faces 38 of carbon segments 34 function as a brush track for the armature when installed for operation.

It should be noted that because of the mechanical and electrical connections between segment 36 including parts such as pawls 18 extending into and bonded by compressed carbon segments 34, no silver metallization nor soldering is necessary as part of the subassembly structure or method.

Figure 7:
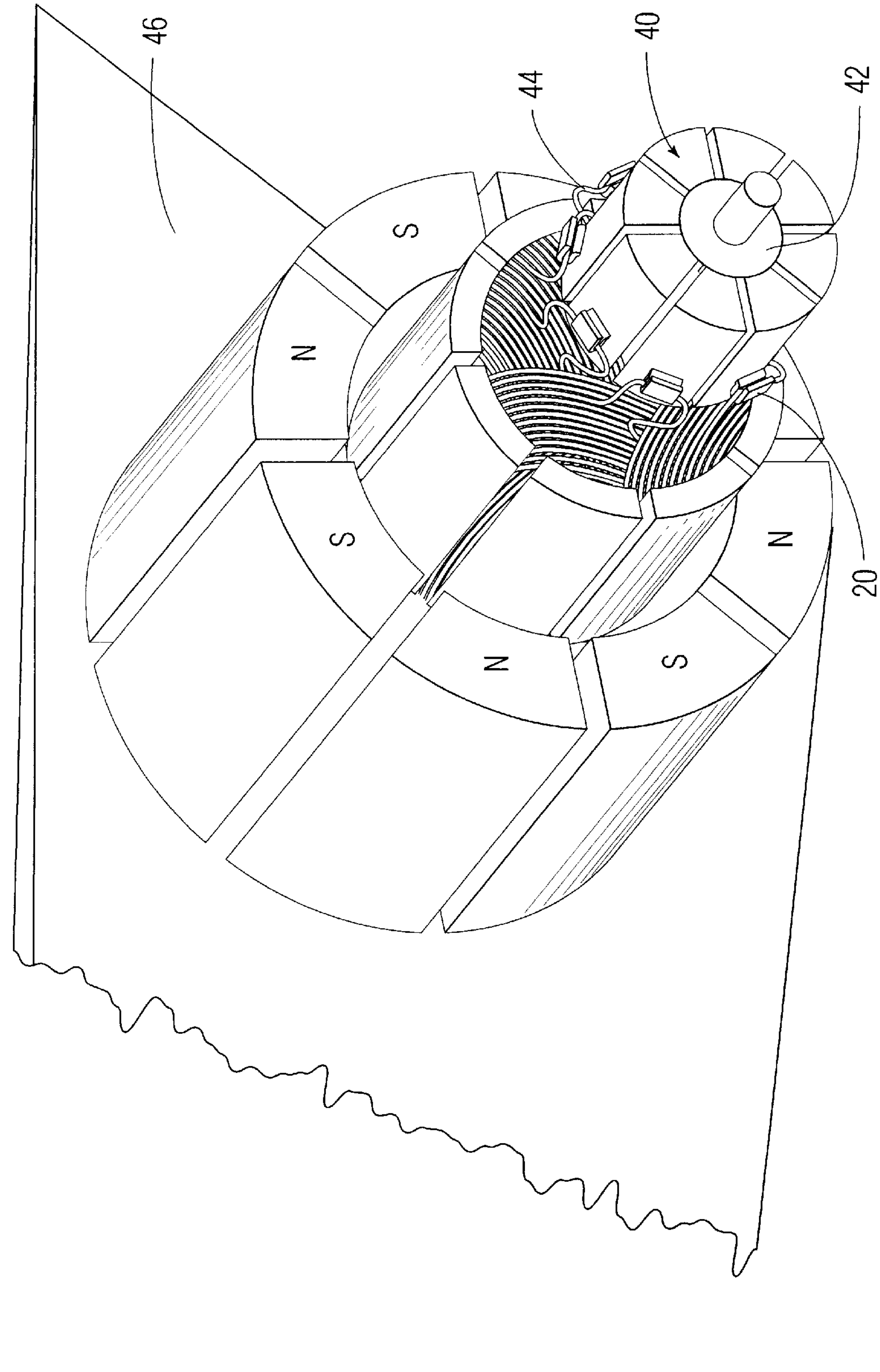
FIG. 7 is a perspective of a pictorial breakaway representation of a part of an electric motor with the subassemblies of FIG. 6 mounted on the rotation shaft after armature winding wires are inserted into the tangs and fused thereto.

Commutator subassembly 40 can now be secured to armature shaft 42 in any known manner. Armature winding wires 44 are wound into tangs 20 generally as shown in FIG. 7. Each tang 20 and wire 44 is then fused, for example, in accordance with U.S. Pat. No. 5,111,015 issued to Edward D. Riordan and owned by JOYAL Products, Inc. having both fusing electrodes engaging the free surface of the tang. Alternatively, if tang 20 were formed with an electrode pad similar to those shown in FIG. 12 A, B or C, then a fusing machine such as that disclosed in U.S. Pat. No. 4,451,722, also owned by JOYAL Products, Inc. can be used. In either case, subassembly 40 enables application of greater power and heat to burn off insulation and fuse tang 20 and wire 44 than with previously known systems because no low temperature solder or bonding materials are used in the subassembly 40. If the motor is to be used as a gasohol fuel pump, the commutator side walls and tangs would be encapsulated in plastic (not shown) to complete the armature. This encapsulation technique is standard and well known. After the rotor or armature is completed, it is assembled into stator 46 or stationary part of the motor in the usual manner to complete the motor assembly.

Figure 8:
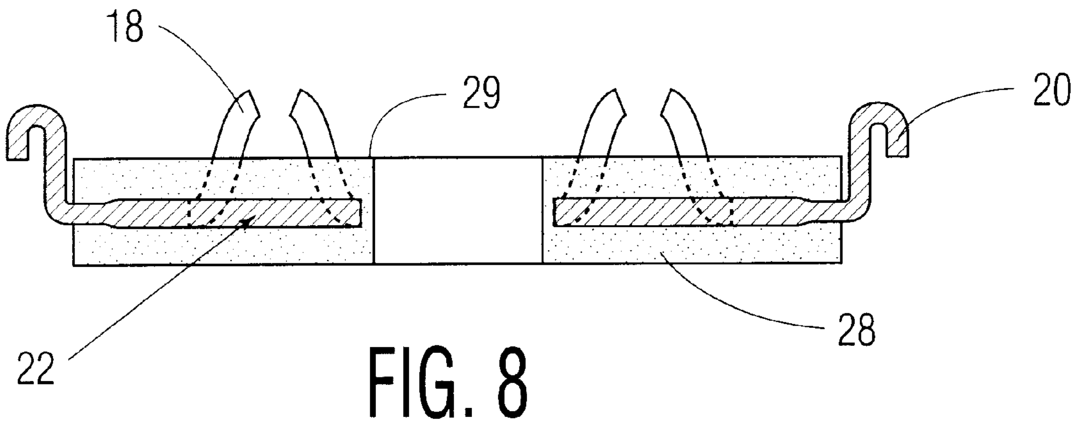
FIG. 8 is a view similar to FIG. 4 for an alternate embodiment of the invention wherein the metallic copper blank is molded into the carbon layer instead of the insulating layer.
Figure 9:
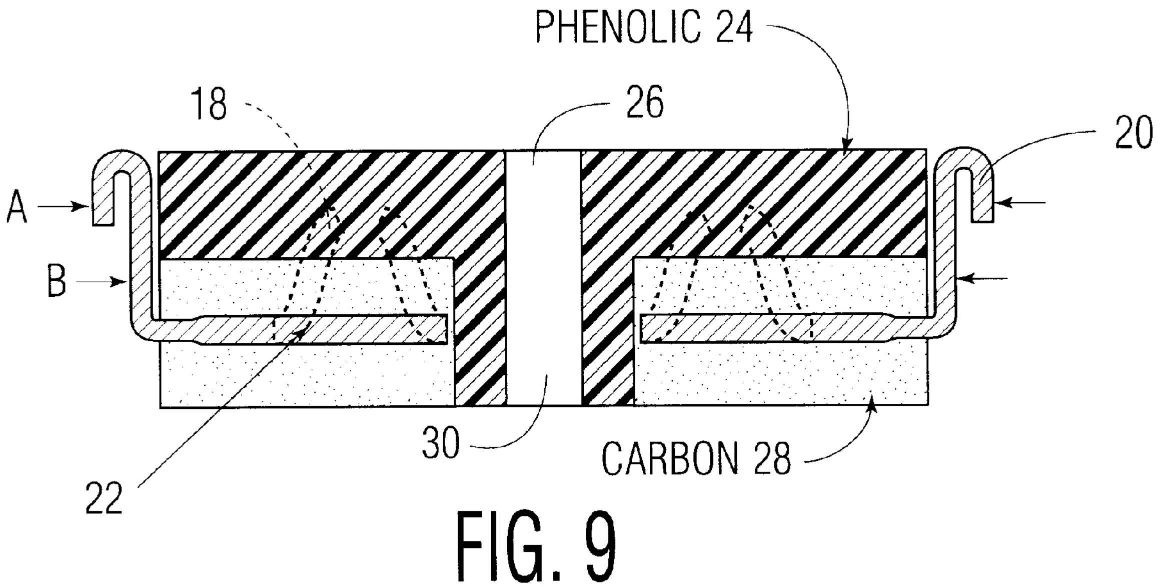
FIG. 9 is the same view as FIG. 8 with the molded insulated layer in place.

With reference to FIGS. 8 and 9, an alternate exemplary embodiment and method of the commutator subassembly includes molding the carbon disk layer 28 completely about the body of metallic disk 22 except for pawls 18 extending through the horizontal facing surface 29 and tangs 20 that extend through the side walls of carbon layer 28. Thereafter, the phenolic layer 24 is molded to the facing surface 29 and to encapsulate pawls 18 for serving as the insulating body. Thereafter, the isolating grooves can be cut to divide the carbon layer 28, metallic body 22, and partial phenolic layer 24 into electrically isolated commutator segments. The commutator subassembly can be thereafter fixed to a rotor shaft as mentioned above. Subsequently, armature winding wire (not shown) can be wound within tang 20 and fusing pressure and temperature applied in the general direction of the arrow A shown in FIG. 9 whereby the side wall of layer 24 will resist some of the fusing forces. During fusing, a ground electrode can press and contact the bottom leg of tang 20 at arrow B since the bottom leg of tang 20 is longer than the top or free leg of tang 20.

Figure 10:
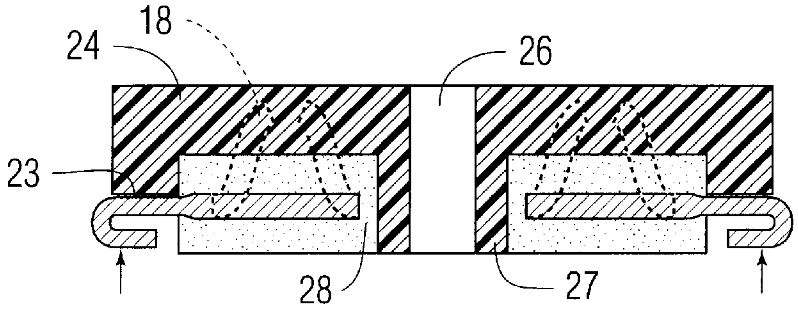
FIG. 10 is the same as FIG. 9 showing an alternate design of the insulating layer and tang.

FIG. 10 shows another embodiment wherein the phenolic layer is molded to extend beyond and longitudinally of the side wall of carbon layer 28. Layer 24 forms a shoulder against which the metallic tang 20 can rest to resist fusing forces when applied in the direction of the arrow of FIG. 10.

Figure 11:
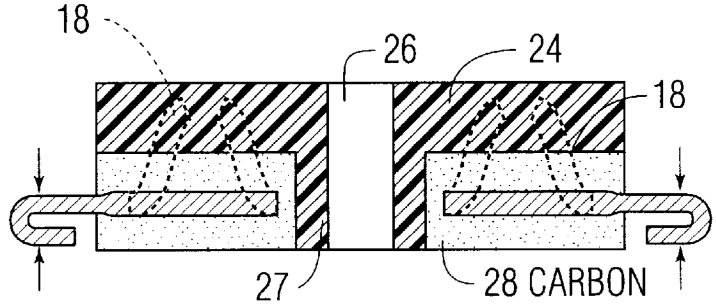
FIG. 11 is the same as FIG. 8 showing an alternate design of the tang.

FIG. 11 shows another embodiment similar to FIG. 8 except the phenolic and carbon layers have the same outer diameters and tang 20 extends radially from the carbon side wall to enable fusing pressure in the direction of the arrows.

Figure 12A:
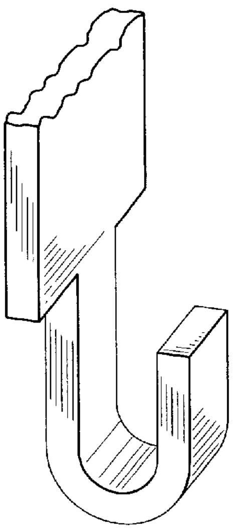
FIGS. 12 A, B, and C are partial perspective views of different tang designs that can be formed as part of the copper commutator segment.
Figure 12B:
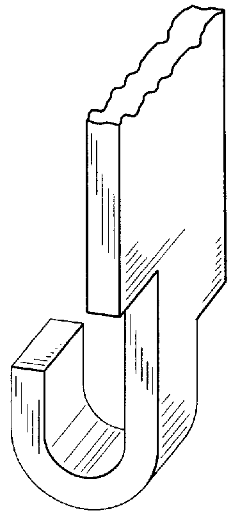
Figure 12C:
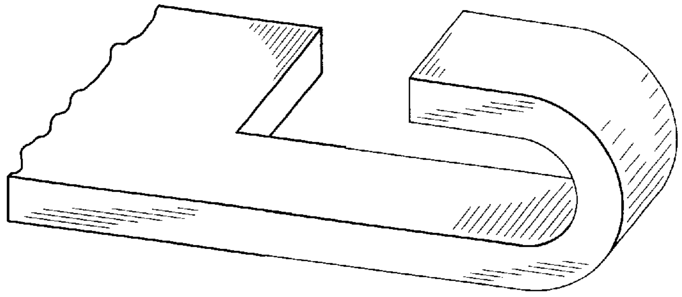

FIGS. 12A, B and C show parts of various other commutator and tang designs that may be used according to the principles of the present invention. In each case, the upper electrode of the fusing machine would contact the tang portion and the lower electrode would contact the entanged pad portion.

Figure 13:
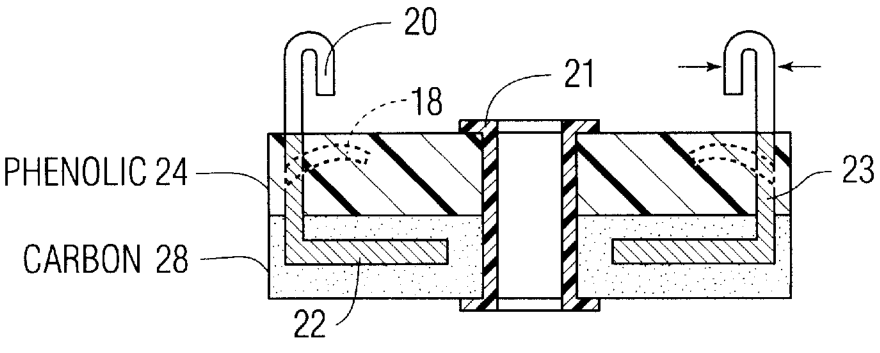
FIG. 13 is similar to FIG. 10 of a further alternate commutator subassembly.

FIG. 13 shows a further embodiment of a disk commutator in process wherein the tang 20 is elongated and bent 90° to the metallic layer 22 body. Pawls 18 are stamped out of the tang portion that extends through phenolic layer 24. In this embodiment, as can be optionally used in the other embodiments disclosed in the other figures herein, bushing or mounting member 21 made of insulating material extends through the openings in layers 24 and 28. Bushing 21 aids in the mechanical strength of the commutator sub-assembly and serves as a shaft mount on the rotor. Fusing pressure and heat are later applied to tang 20 in the direction of the arrows in FIG. 13.

Figure 14:
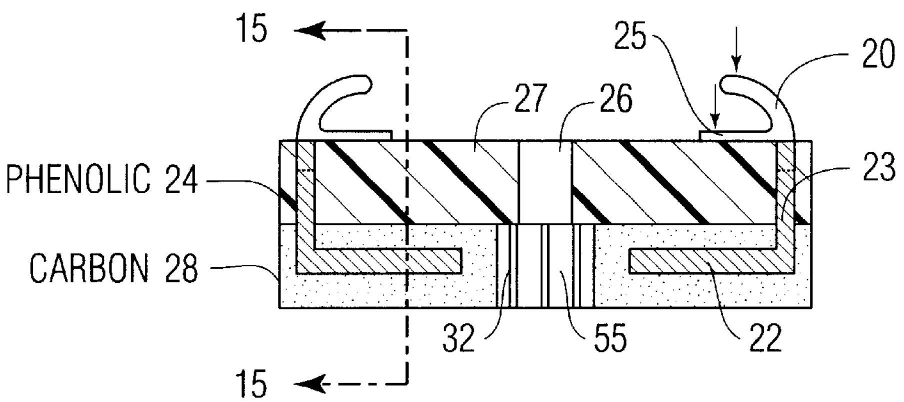
FIG. 14 is a view similar to FIG. 13 of yet a further alternate commutator subassembly.
Figure 15:
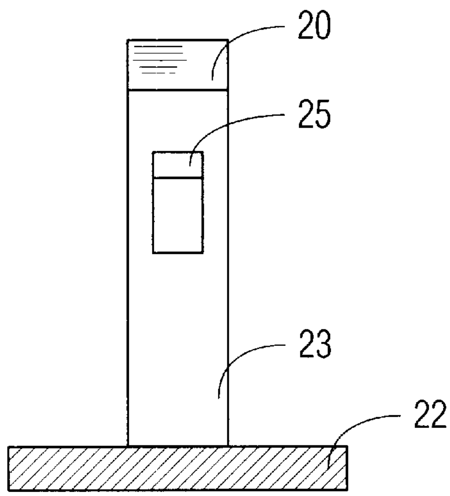
FIG. 15 is a side section view taken along line 15—15 of FIG. 14 with the carbon and phenolic layers removed and showing only a part of the copper body and tang member.

FIG. 14 shows yet a further embodiment similar to that of FIG. 13 but wherein tang 20 is bent at generally a right angle to the metal portion 23 that extends through phenolic layer 24. As seen in FIGS. 14 and 15 a footing tab 25 is stamped from part 23 and extends generally parallel to tang 20. Phenolic layer 24 is molded with its outer surface 27 engaging the undersurface of tab 25. In this way, tab 25 functions to secure the mechanical connection between layers 24 and 28 and also functions as part of the tang system joined to the fused metal wire. If tab 25 has a length extending beyond the profile of tang 20 as shown in FIG. 14, then it can further function as an electrode pad as indicated by the arrow. In the embodiment of FIG. 14, carbon layer 28 includes a central opening 55 with greater diameter than opening 26 in the insulating layer or body 24. Thus, when body 24, the radial inward material of which forms the mounting member on the shaft. is mounted on a rotating motor shaft, the carbon segments will be spaced from the shaft.

Figure 16:
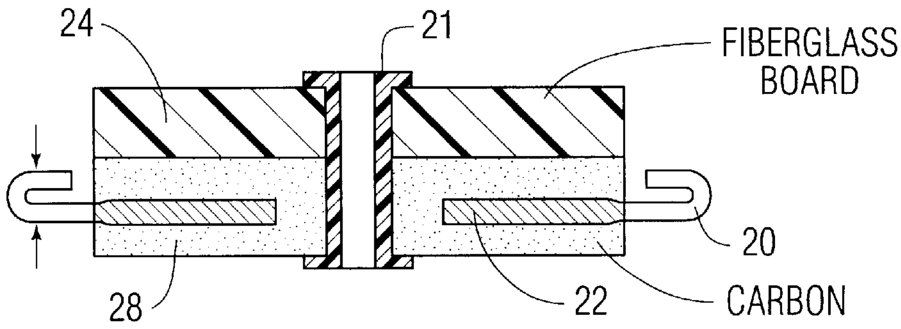
FIG. 16 is a view similar to FIG. 14 showing yet another alternate embodiment of commutator subassembly wherein the commutator segment 22 is molded within the carbon layer except for the tang portion. No part of the metal commutator is molded within the insulating body.

An alternate embodiment according to the invention is shown in FIG. 16 wherein the insulating layer comprises a fiberglass board molded to the carbon layer and wherein the metallic commutator blank is molded completely within the carbon layer except for the metallic portions extending through the side walls. The grooves or slots are cut as described above to slightly within the facing surface of the fiberglass layer. It is preferred to apply adhesive or epoxy between the fiberglass and carbon layers to enhance the mechanical connection therebetween.

Figure 17:
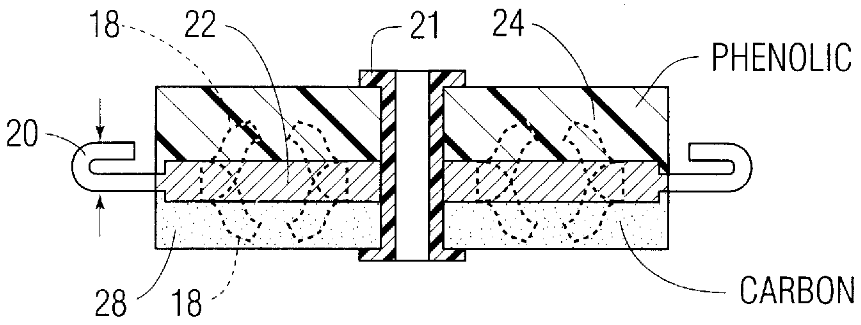
FIG. 17 is a view similar to FIG. 16 of another embodiment of commutation subassembly wherein the metallic commutator forms a barrier between the carbon and insulating layers.

Another embodiment of the flat commutator subassembly according to the invention, FIG. 17, includes the commutator 22 extending across the full dimension of the carbon layer 28 and phenolic layer 24. These layers 24 and 28 are molded to opposite sides of the copper layer 22 with pawls 18 extending into and molded with layers 24 and 28 for the purposes mentioned above. Bushing 21 can be provided to insulate the metal shaft (not shown) and enhance the mechanical strength of the subassembly. In this embodiment, the metallic commutator acts as a boundary layer between the phenolic and carbon layers with parts (pawls 18) extending into both layers 24 and 28.

Figure 18:
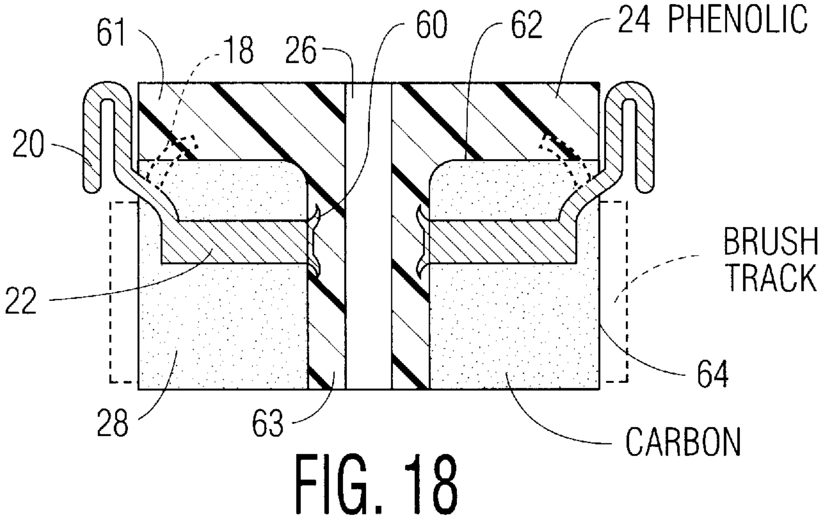
FIG. 18 is a view similar to FIG. 10 showing an exemplary embodiment of a barrel type commutator subassembly.

Exemplary embodiments of barrel type commutator subassemblies according to the principles of the present invention will now be described. The embodiment in FIG. 18 includes the metal body 22 molded within the carbon layer 28 which layer 28 is elongated in the axial direction. Body 22 includes flared inner parts 60 that extend through the inner sidewall of layer 28. Pawls 18 are stamped to extend axially through the top facing wall 62 of layer 28. Tang 20 can extend through the side wall of layer 28. The insulating layer 24 is molded within the inner opening surface of carbon layer 28 and across the facing surface 62 to encapsulate parts 60 and pawls 18 and includes a radial portion 61 and a longitudinal or mounting member portion 63. Carbon layer 28, body 22 and a slight portion of the radial portion of layer 24 are cut to form grooves that isolate the commutator carbon and copper segments from the others and to form the outer wall of layer 28 into barrel type commutator brush tracks 64.

Figure 19:
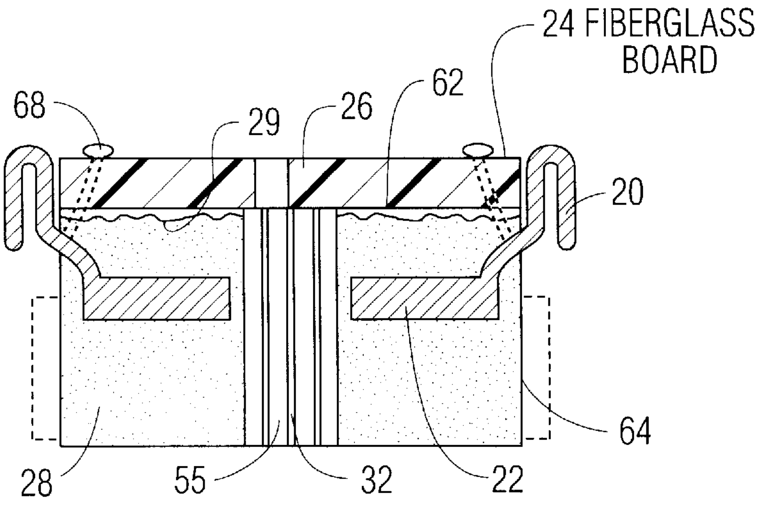
FIG. 19 is a view similar to FIG. 18 showing an alternate embodiment of barrel type commutator subassembly.
Figure 20:
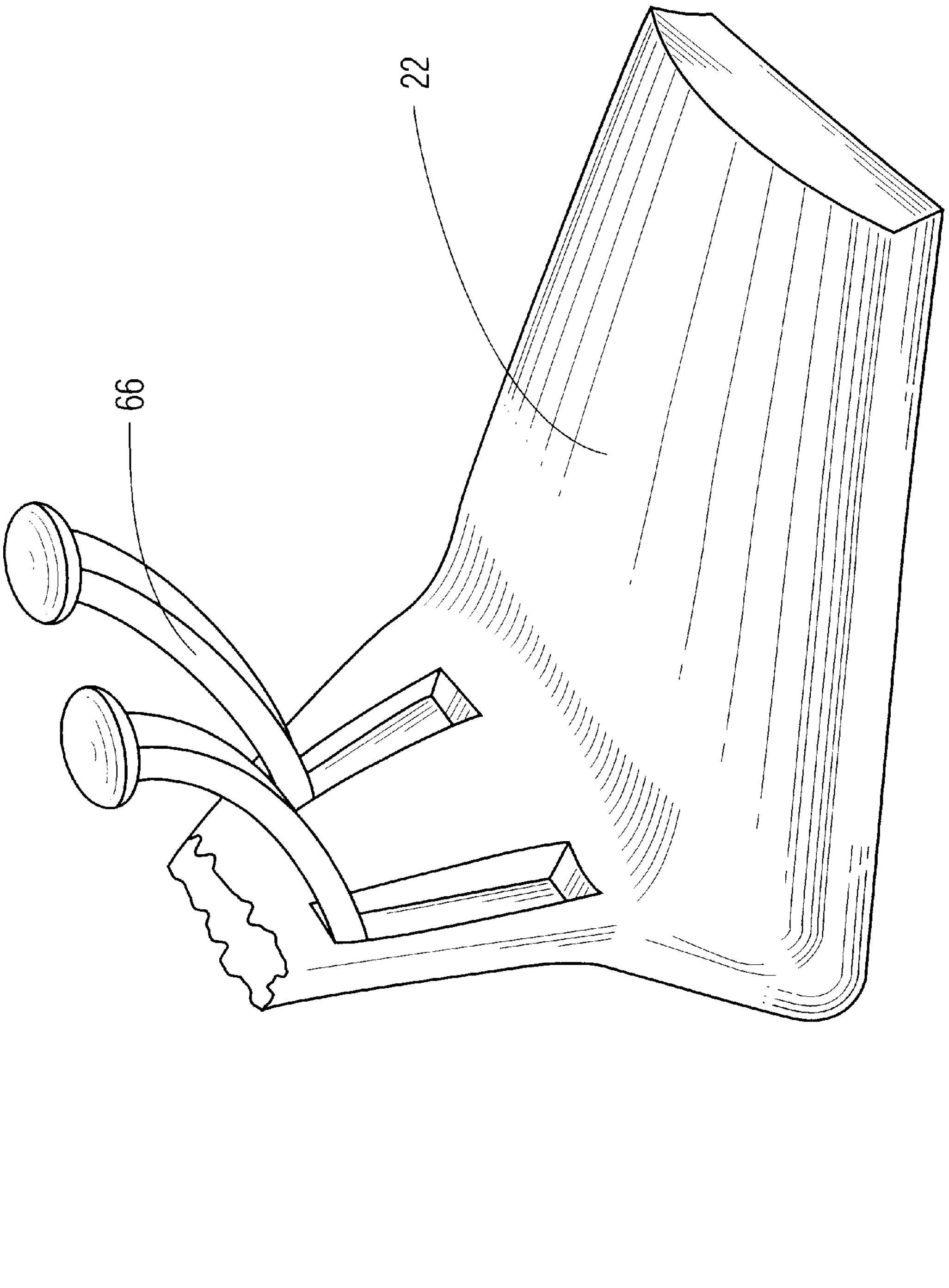
FIG. 20 is an enlarged perspective of one of the metallic commutator segments shown in FIG. 19.
Figure 21:
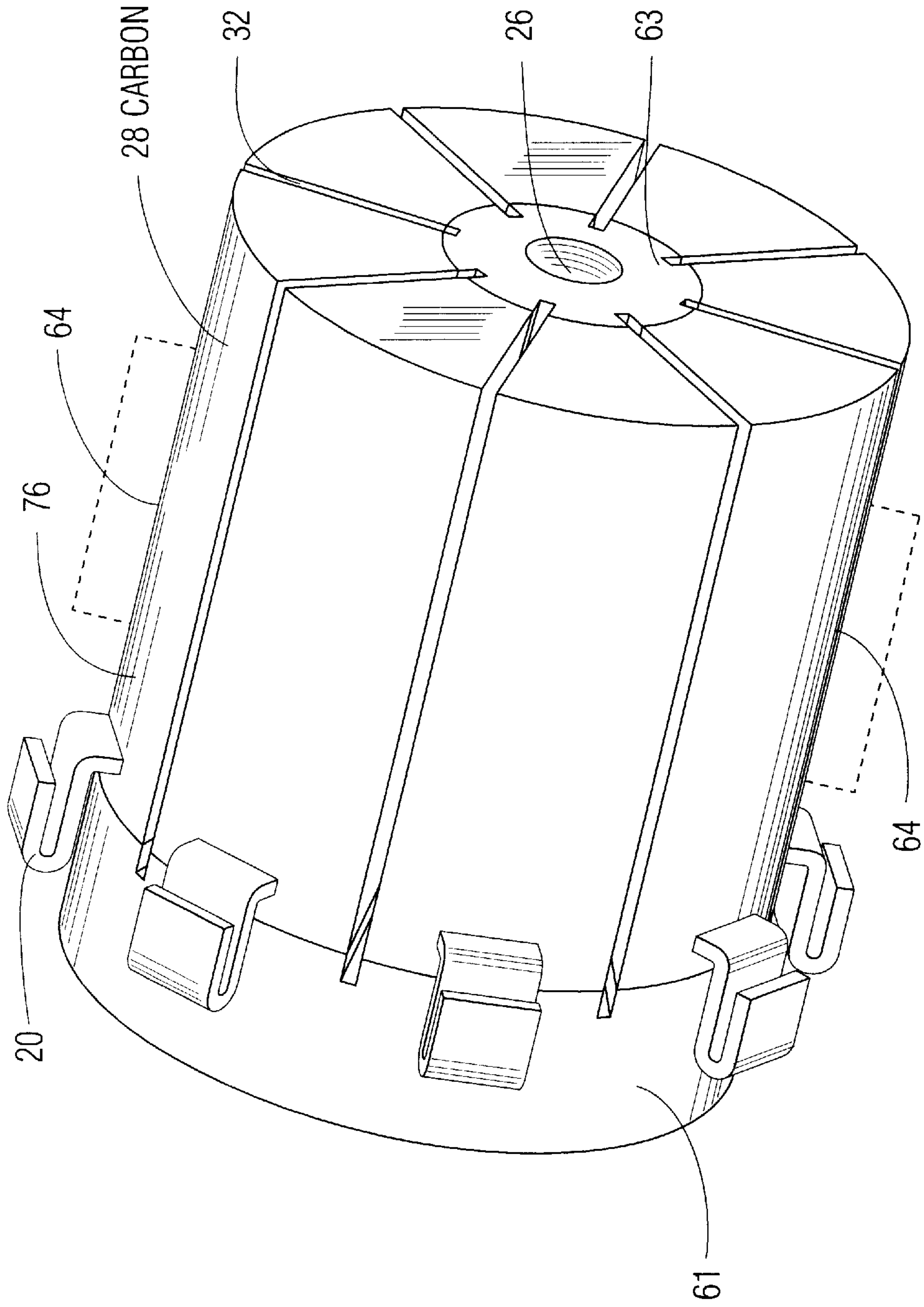
FIG. 21 is a perspective view of the barrel type commutator subassembly of FIG. 18.

Another exemplary barrel type embodiment, FIGS. 19 and 20, includes layer 24 formed from molded fiber glass board secured by adhesive 29 to the facing surface 62 of previously and separately molded layer 28. One or more anchors 66 stamped from the metal tang extension extend up through pre-made openings in fiberglass layer 24. The tips 68 can be enlarged to enhance or reinforce the mechanical connection between layers 28 and 24.

The materials and method steps mentioned above are representations and not limiting in implementing the present invention and alternate sequence steps may be used as desired. It will also be understood that a commutator subassembly in a motor according to the inventive principles can include a central bushing, spool, or eyelet made of insulating material and the exposed metallic parts of the commutator can be encapsulated in protective plastic or other suitable material if the motor is to be used in a harmful environment. Commutator assemblies according to the present invention have application with motors having metal and plastic coated shafts and it is within the present invention to undercut the carbon layer to provide a greater inner diameter to the carbon layer of any of embodiments disclosed herein, similar to opening 55 of the embodiments of FIGS. 14 and 19, so that the carbon segments are spaced from a metal shaft to which the insulating mounting member, eg. phenolic member 24, may be mounted. In this way, bushings or other insulating members need not extend through the layer of carbon segments if desired for certain motor designs.

Various modifications and changes may be made to the herein disclosed embodiments without departing from the spirit and scope of the present invention. It will be understood that the drawings herein are conceptual and schematic and not drawn to scale or in proper industrial requirement symmetry.

What is claimed is:

1. An electric motor comprising a stationary part and a rotating part, said rotating part comprising a shaft having a rotation axis and a commutator subassembly fixed symmetrically to said shaft, said commutator subassembly comprising an insulating body surrounding said shaft, a plurality of circumferentially spaced carbon-based material segments surrounding s aid shaft, each segment having a brush contacting surface, a same plurality of metallic commutators each having a first part molded to and within a corresponding segment for mechanically securing said corresponding segments and commutators and for providing electrical surface contact between said commutators and said corresponding segments, wherein each of said commutators includes a second dart extending out of the corresponding segment and said second part includes a tang member and a wire being electrically and mechanically connected to said tang member, wherein said commutator subassembly comprises a mounting member made of insulating material for securing said plurality of segments to said shaft, and wherein each said commutator includes a third part that extends into and is mechanically secured in the direction transverse the shaft axis by said mounting member, and wherein each of said third parts are molded within and completely surrounded by and in contact with said mounting member, and wherein said first part comprises the body of the commutator and said third part comprises the free end portion of a pawl member formed from the body of said commutator, said pawl member having a segment embedded portion between said free end portion and said body that is surrounded by and molded in contact with a portion of said segment.

2. An electric motor according to claim 1, wherein each said tang member includes a U-shaped portion for being mechanically and electrically connected to the wire, the legs of the U-shaped portion extending generally parallel to the axis of said shaft.

3. An electric motor according to claim 1 wherein each said tang member includes a U-shaped portion for being mechanically and electrically connected to the wire, the legs of the U-shaped portion extending generally perpendicular to the axis of said shaft.

4. An electric motor according to claim 1 wherein said commutator subassembly is one of the flat disk and barrel types.

5. An electric motor according to claim 1 wherein said tang comprises a U-shaped member having first and second legs, said first leg contacting an outer surface of said mounting member and said second leg being located over a portion of said first leg, said first leg being longer than said second leg for providing a ground terminal contact pad for a fusing machine electrode.

* * * * *